United States Patent Office 2,951,053
Patented Aug. 30, 1960

2,951,053

ELASTIC POLYURETHANE COMPOSITION AND METHOD FOR MAKING SAME

Franz Gottfried Reuter and Jurgen Ulderup, Lemforde, Hannover, Germany, assignors, by mesne assignments, to Mobay Chemical Company, Pittsburgh, Pa., a corporation of Delaware No Drawing. Filed Feb. 15, 1956, Ser. No. 565,555

Claims priority, application Germany Feb. 17, 1955

6 Claims. (Cl. 260—28)

This invention relates to a new class of rubber-like polyurethanes. More particularly, this invention pertains to rubber-like polyurethanes of improved friction properties and to a process for producing the same.

It is known to reduce the friction in bearings, guides and other parts of machines with moving surfaces by using molybdenum disulfide as a lubricant. It has also been proposed to incorporate molybdenum disulfide into plastics in order to decrease the friction between these plastics and other materials. It has proven impossible, however, to reduce the friction between rubber or rubber-like synthetic products and other materials by incorporation of molybdenum disulfide.

It is an object of the present invention to provide rubber-like polyurethane plastics with improved friction characteristics. Another object is to provide rubber-like polyurethane plastics which are highly suitable for use in the manufacture of articles with moving surfaces. A further object is to provide a process for the production of these new rubber-like polyurethane plastics. Still further objects will appear hereinafter.

These objects are attained in accordance with the present invention, in other words, the friction characteristics of rubber-like polyurethanes can be improved if along with the molybdenum disulfide a silicone oil and/or a hydrocarbon having a boiling point at atmospheric pressure of over 200° C. is introduced into the rubber-like polyurethane material.

The polyurethane material is prepared in known manner by reacting higher molecular weight organic compounds with terminal hydroxyl groups, such as linear polyesters, polyester amides, polyethers or polythioethers containing terminal hydroxyl groups, with excess diisocyanate to produce an isocyanate-modified reaction product containing free NCO groups and subsequently cross-linking said isocyanate-modified reaction product with a bifunctional compound, such as a glycol, diamine, amino alcohol or water, to obtain a rubber-like polyurethane. For the manufacture of rubber-elastic polyurethanes reference is made to U.S. Patents 2,729,618 and 2,620,516.

The molybdenum disulfide and the silicone oil and/or hydrocarbon which is to be brought into the polyurethane material can be added at any desired stage of the reaction. It is preferred to mix the additives according to the present invention with the linear hydroxyl compound, more specifically, with the hydroxyl polyester, polyester amide, polyether or polythioether serving as the starting material. A preferred embodiment of the invention therefore comprises mixing a linear polyester containing terminal hydroxyl groups with small amounts of molybdenum disulfide, silicone oil and/or hydrocarbon reacting the mixture thus obtained with excess diisocyanate to produce an isocyanate-modified polyester containing free NCO groups and subsequently cross-linking said isocyanate-modified polyester with a glycol to produce a rubber-like polyurethane with outstanding friction characteristics.

It is advantageous to use molybdenum disulfide of high purity. It is then no longer necessary to add the additives to the polyester or the analogous compound serving as starting material, which procedure is given above as a preferred embodiment of the present invention. In any case, if molybdenum disulfide of high purity is used, it can be brought into the reaction mixture at any time before the mixture has been completely hardened. As regards the preparation of pure molybdenum disulfide, reference is made to U.S. Patents 2,367,946 and 2,686,156.

The amount of molybdenum disulfide used in the practice of the invention ranges from about 0.01% to 5%, preferably 0.1 to 1% by weight, based on the weight of the cured rubber-like polyurethane. The molybdenum disulfide may be used in any desired form. It is preferred, however, to employ molybdenum disulfide powder having a particle size within the range of about 0.002 to 2 mm. (in diameter), preferably of about 0.002 to 0.02 mm.

The silicone oil and the hydrocarbon used as adjuvants in accordance with the invention, are preferably added in amounts of 0.01 to 5% by weight, based on the weight of the cured rubber-like polyurethane, although higher amounts may be employed, if desired.

Any liquid organo-polysiloxane may be used as a silicone oil which shows a viscosity of about 50 to 500 centistokes/20° C. Illustrative examples of silicone oils useful in this invention are dimethyl-siloxane polymers with a viscosity of 50 centistokes/20° C., of 140 centistokes/20° C. and 440 centistokes/20° C.

As hydrocarbons, there may be employed, for example, high boiling petroleum fractions, such as kerosene, and conventional lubricating oils. Solid paraffins including wax-like paraffins, such as montan wax, have proven to be particularly useful.

The linear hydroxyl polyesters useful in this invention may be prepared in known manner by thermal esterification of dihydric alcohols and dibasic organic acids, using such an amount of the alcoholic component as to produce a final product having an hydroxyl number within the range of 20 to 80. A convenient mode of carrying out the thermal esterification involves heating the reactants at first to a temperature of about 110° to 120° C. to thereby distill off most of the water formed in the esterification. The esterification is then completed by slowly raising the temperature to about 210° to 220° C. while reducing the pressure. In order to free the hydroxyl polyester produced from any moisture, the same is heated to a temperature of about 110° to 150° C. in vacuo or treated with an inert gas at elevated temperature. If a polyester amide is to be produced, a certain amount of an amine or an amino alcohol is employed together with the other starting materials for the manufacture of polyesters.

The linear polythioethers useful in this invention may be prepared in known manner by thermal condensation of thioether glycols with polyhydric alcohols in a molar ratio within the range of about 1:1 to about 1:1.5. The reaction mixture is heated in the presence of a dehydration catalyst to a temperature of 150° to 250° C. while distilling off the water formed in the etherification.

Diisocyanates which may be used in the reaction with the linear hydroxyl polyesters to prepare isocyanate-modified polyesters include 2,4-toluylene diisocyante, 2,6-toluylene diisocyanate, p-phenylene diisocyanate, 4,4'-diphenylmethane diisocyanate, 1,5-naphthylene diisocyanate, dibenzidine diisocyanate and benzidine diisocyanate. In the preparation of the isocyanate-modified polyester, the diisocyanate is used in an excess of 20 to 250%, over the amount required for reacting with the hydroxyl groups of the linear polyester. The reaction is preferably carried out at temperatures of between 80° to 180° C.

The isocyanate-modified polyester thus prepared is then subjected to a cross-linking reaction with a glycol, diamine or amino alcohol to thereby obtain a cured rubber-like material. Glycols which may be used in the cross-linking reaction are, for example, 1,3-propylene glycol, 1,3-butylene glycol, 1,4-butylene glycol, quinite and analogous compounds. Suitable amines are, for instance, tetramethylene diamine, pentamethylene diamine and hexamethylene diamine. Amino alcohols useful as cross-linking agents are, e.g., aminopropanol, β-aminopropanol and ε-aminohexanol. The cross-linking is preferably effected by heating the components to a temperature within the range of 60° to 180° C. using the cross-linking agent in an amount insufficient to react with all free NCO groups contained in the isocyanate-modified polyester. It is preferred to dissolve a small amount of an acid, such as dry hydrogen chloride, or an acid producing compound, e.g. acid chlorides like acetyl chloride or thionyl chloride, in the cross-linking agent in order to adjust the cross-linking time, which otherwise would be too short due to the presence of molybdenum disulfide. The acid is employed in an amount of 0.001 to 1%, preferably 0.002 to 0.1% by weight, based on the weight of cross-linking agent.

As already being stated, the required amount of molybdenum disulfide, silicone oil and/or hydrocarbon is preferably incorporated into the polyester. If desired, it is, however, possible to add the additives to the isocyanate-modified polyester or to the cross-linking agent.

The rubber-like polyurethane plastics of the invention display an extraordinarily low friction with other materials. Thus, the coefficient of friction between the novel rubber-like polyurethanes and steel is of the order of 0.1.

Due to their superior friction properties, the rubber-like polyurethane plastics of the invention are particularly suitable for use in the manufacture of bearings, bearing bushings, ball-and-socket joints, ball pivots, door latches, car door bumpers, etc. The life of parts produced from the rubber-like polyurethanes of the invention and used in bearings, guides and so on is several times as long as that of corresponding parts made of conventional rubber-like polyurethanes.

This effect is due to the fact that the silicone oil and/or the hydrocarbons are non-compatible with the cured rubber-like polyurethane products, so that they sweat out forming a thin film on the surface of said products. Moreover, these additives push certain amounts of the molybdenum disulfide to the surface, the film formed on the surface of said products thereby containing molybdenum disulfide. This provides a film of lubricating material on the polyurethane product, the material being restored as soon as it is used up.

The invention is not restricted to the employment of silicone oil and hydrocarbons. Any additives may be used which are non-compatible with the rubber-like polyurethane products, in other words, additives which will sweat out. Such further additives are, for instance, waxes, e.g. carnauba wax and beeswax.

Moreover, it is also feasible to replace the molybdenum disulfide by other inorganic lubricating agents, for example, molybdenum diselenide, molybdenum ditelluride, tungsten sulfide, titanium sulfide, etc.

Of course, the above additives may also be used in admixture with each other.

The details of the present invention will be apparent to those skilled in the art from a consideration of the following typical examples, the parts being given are by weight.

Example 1

1,000 parts of a linear hydroxyl polyester obtained by thermal esterification of adipic acid with ethylene glycol and characterized by having a molecular weight of 2,000, an hydroxyl number of 50 and an acid number of 1 is heated at 135° C. in vacuo for 1 hour in order to completely remove the moisture contained therein. Then 3 parts of molybdenum disulfide, particle size 0.01 mm. (in diameter), 3 parts of a dimethyl-siloxane polymer with a viscosity of 140 centistokes/20° C. and 2 parts of solid paraffin are added. Subsequently, 300 parts of naphthylene-1,5-diisocyanate are introduced into the mixture. The components are allowed to react for 10 minutes in vacuo. Thereupon, 70 parts of 1,4-butanediol containing 1% of dry hydrogen chloride are added within 1 minute to the melt with vigorous stirring. The resulting product is poured into heated molds where it is maintained for 24 hours at 110° C. to produce a cured rubber-like material. The elastomer thus obtained is black and distinguished by the particular properties of its surface.

Example 2

1,000 parts of a linear hydroxyl polyether obtained by thermal condensation of thiodiglycol (1,220 parts) with ethylene glycol (620 parts) in the presence of 0.25% of p-toluene-sulfonic acid-methylester and characterized by having an OH number of 63 are mixed with 190 parts of 1,5-naphthylene diisocyanate by stirring at 124° C. 2.5 parts of molybdenum disulfide, particle size 0.22 mm. (in diameter), and 2 parts of a dimethyl-siloxane polymer with a viscosity of 50 centistokes/20° C. are added to this mixture. The mixture is allowed to react for 9 minutes in vacuo. Thereupon 21 parts of 1,4-butylene glycol are added within 1 minute to the melt with vigorous stirring. The resulting product is poured into molds and heated for a further 24 hours at 110° C. to produce a cured rubber-like material with outstanding friction properties.

Example 3

1,000 parts of the linear hydroxyl polyester according to Example 1 is mixed with 0.1 part of molybdenum disulfide and 0.05 part of montan wax. The polyester is then heated at 130° C. in vacuo for 1 hour in order to completely remove the moisture contained therein. Subsequently 25 parts of 1,4-phenylene diisocyanate are introduced into the mixture. The components are allowed to react for 10 minutes in vacuo. 8.1 parts of quinitol containing 0.2 part of acetyl chloride are added within 1 minute to the melt. The resulting product is then poured into heated molds and held at a temperature of 100° C. for 24 hours. The rubber-like material thus obtained exhibits excellent friction properties.

Example 4

1,000 parts of the polythioether prepared as in Example 2 are mixed at 120° C. with 140 parts of 2,4-toluylene diisocyanate. After adding 1 part of molybdenum disulfide together with 1 part of a dimethyl-siloxane polymer with a viscosity of 440 centistokes/20° C. and 0.5 part of solid paraffin to this mixture, 5.5 parts of o-dichlorobenzidine are given within 1 minute to the melt. The reaction product is then poured into heated molds where it is maintained for 24 hours at 150° C., a cured rubber-like material being produced thereby.

While certain representative embodiments and details have been shown for the purpose of illustrating this invention, it will be apparent to those skilled in the art that various changes and modifications may be made therein without departing from the spirit and scope of the invention.

We claim:

1. An elastic polyurethane containing from about 0.01 percent to about 5 percent by weight, based on the weight of said polyurethane, of a member selected from the group consisting of molybdenum disulfide, molybdenum diselenide, molybdenum ditelluride, tungsten sulfide and titanium sulfide and from about 0.01 percent to about 5 percent by weight, based on the weigh of said polyurethane, of a member selected from the group consisting of silicone oil having a viscosity of from about 50 centistokes to about 500 centistokes at 20° C., petroleum lubricating oil, kerosene, hydrocarbon waxes, montan wax, beeswax, carnauba wax, and mixtures thereof.

2. A shaped article of an elastic polyurethane containing from about 0.01 percent to about 5 percent by weight, based on the weight of said polyurethane, of a member selected from the group consisting of molybdenum disulfide, molybdenum diselenide, molybdenum ditelluride, tungsten sulfide and titanium sulfide and from about 0.01 percent to about 5 percent by weight, based on the weight of said polyurethane, of a member selected from the group consisting of silicone oil having a viscosity of from about 50 centistokes to about 500 centistokes at 20° C., petroleum lubricating oil, kerosene, hydrocarbon waxes, montan wax, beeswax, carnauba wax, and mixtures thereof.

3. The product of claim 1 wherein the first said group member is molybdenum disulfide having a particle size of from about 0.002 millimeter to about 2 millimeters in diameter.

4. An elastic polyurethane containing from about 0.01 percent to about 5 percent by weight, based on the weight of said polyurethane, molybdenum disulfide and from about 0.01 percent to about 5 percent by weight, based on the weight of said polyurethane, silicone oil having a viscosity of from about 50 centistokes to about 500 centistokes at 20° C.

5. A method for making an elastic polyurethane of improved friction characteristics which comprises incorporating in the said polyurethane during its preparation from about 0.01 percent to about 5 percent by weight, based on the weight of said polyurethane, of a member selected from the group consisting of molybdenum disulfide, molybdenum diselenide, molybdenum ditelluride, tungsten sulfide and titanium sulfide and from about 0.01 percent to about 5 percent by weight, based on the weight of said polyurethane, of a member selected from the group consisting of silicone oil having a viscosity of from about 50 centisokes to about 500 centisokes at 20° C., petroleum lubricating oil, kerosene, hydrocarbon waxes, montan wax, beeswax, carnauba wax, and mixtures thereof.

6. A method for making an elastic polyurethane of improved friction characteristics which comprises incorporating in the said polyurethane from about 0.01 percent to about 5 percent by weight, based on the weight of said polyurethane, molybdenum disulfide and from about 0.01 percent to about 5 percent by weight, based on the weight of said polyurethane, silicone oil having a viscosity of from about 50 centistokes to about 500 centistokes at 20° C.

References Cited in the file of this patent

UNITED STATES PATENTS

| | | |
|---|---|---|
| 2,449,510 | Robertson | Sept. 14, 1948 |
| 2,558,584 | Safford | June 26, 1951 |
| 2,577,281 | Simon | Dec. 4, 1951 |
| 2,686,155 | Willis et al. | Aug. 10, 1954 |
| 2,698,816 | Dosmann et al. | Jan. 4, 1955 |
| 2,770,612 | Schollengberger | Nov. 13, 1956 |

OTHER REFERENCES

Ellis: "The Chemistry of Synthetic Resins," published 1935 by Reinhold Publishing Corp., pages 1327–1328.

Bennett: "Commercial Waxes," published 1944 by Chemical Publishing Company, Brooklyn, New York, page 1.